(12) United States Patent  
Kim

(10) Patent No.: US 7,839,445 B2
(45) Date of Patent: Nov. 23, 2010

(54) IMAGE PHOTOGRAPHING APPARATUS AND METHOD

(75) Inventor: Sung-Sik Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 719 days.

(21) Appl. No.: 11/548,682

(22) Filed: Oct. 11, 2006

(65) Prior Publication Data

US 2007/0126908 A1 Jun. 7, 2007

(30) Foreign Application Priority Data

Oct. 11, 2005 (KR) ...................... 10-2005-0095721

(51) Int. Cl.
*H04N 5/222* (2006.01)
(52) U.S. Cl. .............................. 348/333.05; 348/333.02
(58) Field of Classification Search ........................ None
See application file for complete search history.

(56) References Cited

U.S. PATENT DOCUMENTS

| | | | |
|---|---|---|---|
| 5,821,997 A | | 10/1998 | Kawamura et al. |
| 6,407,772 B2 * | | 6/2002 | Mizoguchi ............... 348/220.1 |
| 6,487,366 B1 | | 11/2002 | Morimoto et al. |
| 6,885,395 B1 * | | 4/2005 | Rabbani et al. .......... 348/231.1 |
| 7,286,177 B2 * | | 10/2007 | Cooper .................. 348/333.02 |
| 2001/0000969 A1 * | | 5/2001 | Ohta et al. .................. 348/231 |
| 2003/0193602 A1 | | 10/2003 | Santoh et al. |
| 2004/0002302 A1 * | | 1/2004 | Takemoto et al. .......... 455/3.06 |

FOREIGN PATENT DOCUMENTS

| | | |
|---|---|---|
| EP | 0 978 988 A1 | 2/2000 |
| EP | 1 069 764 A2 | 1/2001 |
| EP | 1 548 730 A2 | 12/2004 |
| EP | 1 571 825 A1 | 9/2005 |
| JP | 62057368 | 3/1987 |
| JP | 63286078 | 11/1988 |
| JP | 11298848 | 10/1999 |
| JP | 2003078801 | 3/2003 |
| JP | 2005-229326 | 8/2005 |

* cited by examiner

*Primary Examiner*—Justin P Misleh
(74) *Attorney, Agent, or Firm*—Lee, Hong, Degerman, Kang & Waimey

(57) ABSTRACT

A photographic apparatus and method are disclosed in which a preview of an acquired image and at least one image quality variable image are displayed in a multiview image. The image quality variable image is an image wherein the acquired image is coded, compressed and decoded according to at least one plurality of quantizing coefficients, and is displayed as part of the multiview image according to the user's selection of image quality. Upon the user's selection of image quality, the corresponding image quality variable is stored in memory thereby enabling a user to select image quality in real time before storing an image.

23 Claims, 4 Drawing Sheets

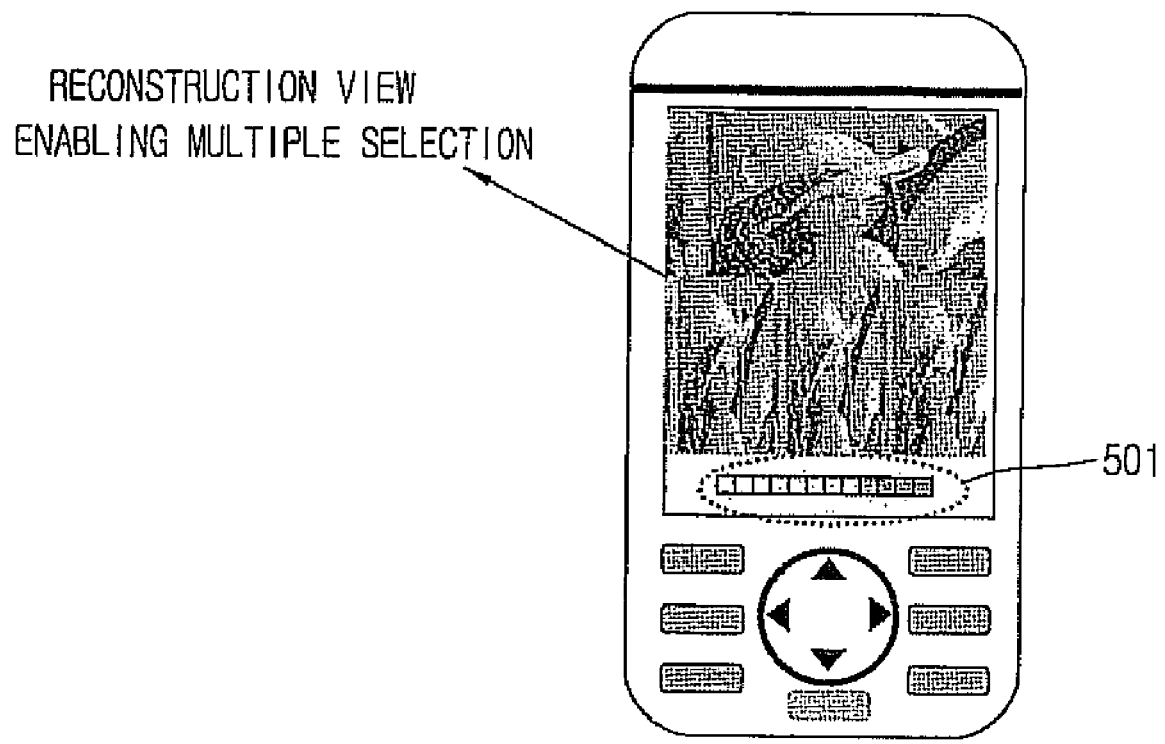

IMAGE PHOTOGRAPHING APPARATUS AND METHOD

CROSS REFERENCE TO RELATED APPLICATIONS

This application claims the benefit of the Korean Patent Application No. 10-2005-0095721, filed on Oct. 11, 2005, which is hereby incorporated by reference as if fully set forth herein.

BACKGROUND OF THE INVENTION

1. Field of the Invention

The present invention relates to an image photographing apparatus and method, and more particularly, to an image photographing apparatus and method which provides a multiview image by which the quality of an image compressed can be checked in real time when a subject is photographed to produce a still or moving image.

2. Description of the Background Art

A mobile communication terminal ("terminal") providing multimedia service to which a variety of functions are added has evolved from a mobile communication technology providing voice only communications.

Recently, the Internet, broadcasting and an image mail service have been provided for use with terminals. Supplementary features such as an MP3 player and a camera are often provided with the terminal for playing music and photographing an image.

In general, the camera is fixedly positioned at an upper center on one side of the terminal, and an image acquired by the camera is displayed on an LCD screen of the terminal. When still or moving images are acquired by the terminal, a user is generally unaware of the quality of the images as they are compressed and stored by just previewing the images on the terminal's display screen.

Also, since the users can only check the compressed and stored images one by one, user convenience is diminished.

SUMMARY OF THE INVENTION

Therefore, an object of the present invention is to provide an apparatus and method which maximizes user convenience by providing a multiview image by which the quality of an image can be checked in real time prior to the image being compressed when a subject is photographed to produce a still or moving image.

To achieve these and other advantages and in accordance with the purpose of the present invention, as embodied and broadly described herein, an image photographing apparatus is provided comprising: a camera acquiring an image; and an image processing unit processing the acquired image into an image quality variable image; and a display unit displaying the processed image quality variable image.

To achieve these and other advantages and in accordance with the purpose of the present invention, as embodied and broadly described herein, an image photographing method is provided comprising acquiring an image by photographing a subject; creating a preview image by the image signal processing of the acquired image; creating an image quality variable image by quantizing the acquired image; displaying the preview image and the image quality variable image in a multiview image; and storing the image according to an image quality selected by a user.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings are included to provide a further understanding of the invention and are incorporated in and constitute a unit of this specification, and illustrate embodiments of the invention and together with the description serve to explain the principles of the invention. In the drawings:

FIG. 5 is an exemplary view showing a multiview image on the screen in accordance with another embodiment of the present invention.

DETAILED DESCRIPTION OF THE EMBODIMENTS

Reference will now be made in detail to the one embodiment of the present invention, examples of which are illustrated in the accompanying drawings.

A mobile communication terminal having a camera is described in one embodiment of the present invention. When a video or an image is acquired, the terminal displays the image quality of the video or the picture according to compression ratio prior to storing the video or image. Accordingly, selection can be made of one of a plurality of images by displaying the plurality of images according to the compression ratios.

To provide a selection of real-time image qualities, the terminal has a multiview image function.

Figure 1:
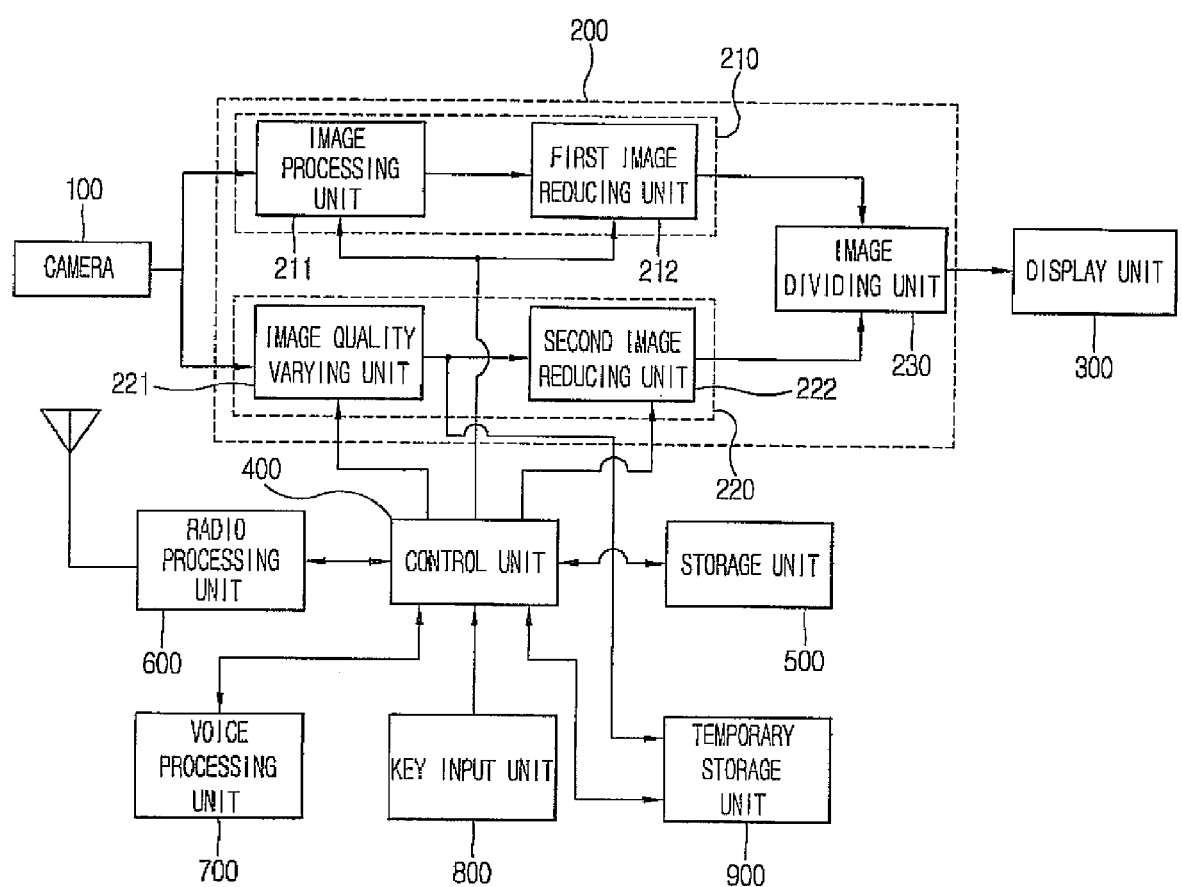
FIG. 1 is a block diagram illustrating a mobile communication terminal having a camera therein in accordance with one embodiment of the present invention.

As shown in FIG. 1, one embodiment of the present invention includes: a camera 100 acquiring an image of a subject; an image processing unit 200; a control unit 400; a display unit 300; a storage unit 500; a radio processing unit 600; a voice processing unit 700; a key input unit 800; and a temporary storage unit 900.

The image processing unit 200 processes an image acquired by the camera 100 into a preview image and an image quality variable image. The image processing unit 200 separates the processed preview image from the image quality variable image and processes both images to provide a multiview image.

The image processing unit 200 includes a preview image processing unit 210, an image quality variable image processing unit 220, and an image dividing unit 230.

The preview image processing unit 210 processes the image acquired by the camera 100 and reduces the size of the processed image to provide a preview image, and further includes an image processing unit 211 and a first image reducing unit 212.

The image processing unit 211 processes the image acquired by the camera 100. The first image reducing unit 212 reduces the size of the image processed in the image processing unit 211 to a predetermined size.

The image quality variable image processing unit 220 varies image quality of the image acquired by the camera 100 and reduces the acquired image of which image quality has been varied to provide at least one image quality variable image.

The image quality variable image processing unit 220 includes an image quality varying unit 221 and a second image reducing unit 222.

The image quality varying unit 221 codes and compresses the acquired image by a predetermined quantizing coefficient and decodes the compressed image to provide an image quality variable image.

The second image reducing unit 222 reduces the image quality variable image by a predetermined size. In addition, the second image reducing unit 222, when a plurality of image quality variable images are provided, reduces the image quality variable images to be of equal size for displaying on a portion of the display screen.

The image dividing unit 230 processes the preview image and the image quality variable images into a single multiview image for display on the display unit 300.

The control unit 400 controls image processing and image size of the preview image, selects a quantizing coefficient, codes and compresses the image by the selected quantizing coefficient, and controls the size of the compressed image quality variable image.

In addition, the control unit 400, according to a user's selection, selects one or more quantizing coefficients and compresses an image by the selected one or more quantizing coefficients to thereby vary the image quality according to the selected quantizing coefficient.

In addition, the control unit 400 temporarily stores the acquired image and each compression image which is coded and compressed by one or more quantizing coefficients, and stores the image compressed according to compression ratio selected by the user.

In addition, the control unit 400 displays the remaining memory according to storage of the compression image selected by the user, and also displays a level bar to adjust image quality of the image by stages.

The storage unit 500, according to the present invention, stores a table of quantizing coefficients corresponding to image compression ratios.

The temporary storage unit 900, temporarily stores the acquired image and the images coded and compressed by one or more quantizing coefficients.

In addition, the control unit 400 performs the overall control of the terminal. The storage unit 500 stores applications programs operating the features of the terminal and additional supplementary information such as telephone numbers and text message.

The key input unit 800 receives user's commands, and more particularly, commands a multiview image mode selection and a compression image selection.

The voice processing unit 700 processes a voice signal by radio for radio communication. The radio processing unit 600 transmits the voice signal processed in the voice processing unit 700 to a receiving side.

Figure 2:
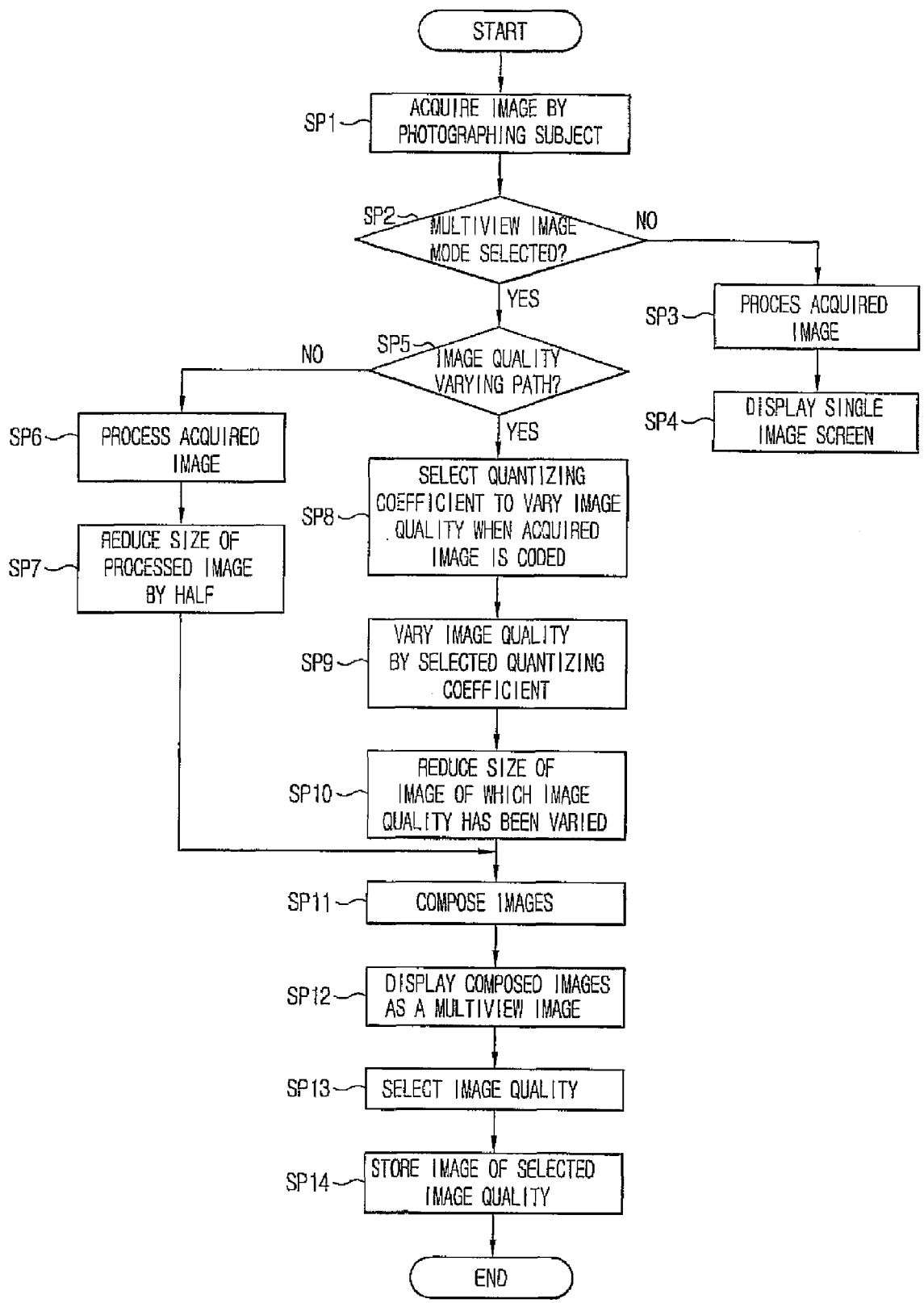
FIG. 2 is an operational flowchart of an image photographing method in a mobile communication terminal having a camera therein in accordance with embodiment of the present invention.

The operation and effect in accordance with the embodiment of the present invention will be described in accordance with an operational flowchart of FIG. 2.

The storage unit 500 stores a table of quantizing coefficients corresponding to image compression ratios in which the higher value a quantizing coefficient has, the more the compression ratio increases and accordingly, the more the image quality of the image is deteriorated.

First, the camera 100 photographs a subject and acquires an image (SP1).

Figure 3:
FIG. 3 is an exemplary view showing a typical single image as a preview image on a screen in FIG. 1.

The control unit 400 determines whether or not a multiview image mode is selected (SP2). If the multiview image mode is not selected, the control unit 400 processes the image acquired by the camera 100 (SP3) and displays a single image on the display unit 300 as a preview image as shown in FIG. 3 (SP4).

When the multiview image mode is selected (SP2), the control unit 400, performs a preview image processing procedure (SP5, SP6 and SP7) and an image quality variable image processing procedure (SP5, SP8 to SP10) to display a multiview image.

The preview image processing procedure and the image quality variable image processing procedure will be described below. First, the preview image processing procedure will be described. The image acquired by the camera 100 is processed (SP6) and the size of the processed image is reduced by half with respect to the screen to produce a preview image (SP7).

The image quality variable image processing procedure is described as follows: First, according to a user's command provided by the key input unit 800, the control unit 400 selects one or more quantizing coefficients which have been previously stored in the storage unit 500 (SP8).

Next, the image quality varying unit 221 codes the acquired image by the one or more quantizing coefficients and compresses each coded image, and then decodes each of the compressed images to produce one or more image quality variable images (SP9). The control unit 400 stores the one or more compression images in the temporary storage unit 900. Then, the second image reducing unit 222 reduces the one or more image quality variable image signals provided by the image quality varying unit 221.

When one image quality variable image is provided by the image quality varying unit 221, the second image reducing unit 222 reduces the image quality variable image in half and provides the reduced image quality variable image (SP10).

In addition, when a plurality of image quality variable image signals are inputted from the image quality varying unit 221, the second image reducing unit 222, reduces the plurality of image quality variable image signals to be of equal size for display on a screen divided in half, and provides the plurality of image quality variable images having been reduced to equal size.

Figure 4:
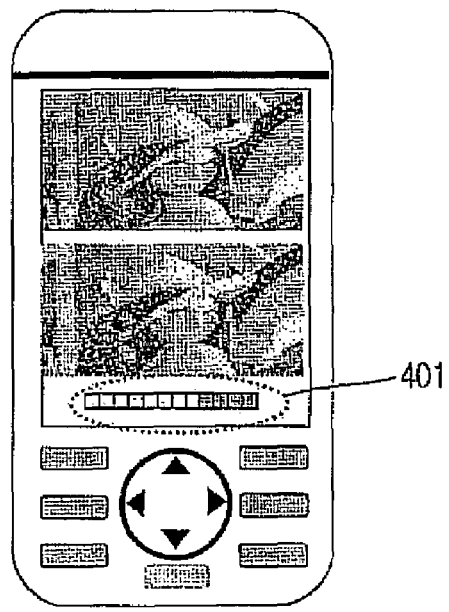
FIG. 4 is an exemplary view showing a multiview image on a screen in accordance with one embodiment of the present invention in FIG. 1.

The image processing unit 200 compresses the preview image and the image quality variable image on one screen (SP11), and displays a multiview image as shown in FIG. 4 on the display unit 300 (SP12).

Also, the image processing unit 200 displays the preview image and the plurality of image quality variable images on one screen as a multiview image as shown in FIG. 5 on the display unit 300.

A level bar 401 as shown in FIG. 4 is displayed on the multiview image to allow the user to adjust image quality of a compression image by stages. The remaining memory is displayed on the screen, according to storage of the compression image selected by the user.

Accordingly, the user adjusts image quality of the image quality variable image from the multiview image using the level bar 501 as shown in FIG. 5 and checks the remaining memory depending upon storage of the compression image in advance of actually storing the compressed image.

If the available memory is sufficient, the selected (SP13) image quality variable image is stored in the storage unit 500 (SP14).

Accordingly, the control unit 400 moves the image quality variable image previously stored in the temporary storage unit 900 to the storage unit 500. The image stored in the storage unit 500 is stored as a picture or a video according to a user's selection.

In the present invention when a subject is photographed to produce a still or moving image and displayed on the screen, a multiview image by which the quality of a compressed image can be checked in advance of storing the image.

As so far described, the present invention provides a multiview image through which image quality of a compressed image can be checked in order to maximize user convenience when a subject is photographed to produce a still or moving image in the terminal having a camera.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An image photographing apparatus comprising:
   a camera configured to acquire an image;
   a first image processing unit configured to process the acquired image into a preview image, a second image and a third image, the second and third image having an image quality different from each other and from an image quality of the preview image;
   a control unit configured to control image processing of the acquired image, the preview image, the second image and the third image; and
   a display unit configured to display the processed preview image, the processed second image, and the processed third image,
   wherein the display unit simultaneously displays the entire processed preview image at a reduced size, the entire processed second image at a reduced size, the entire processed third image at a reduced size and a level bar,
   wherein the level bar is provided by the control unit and is configured for individually adjusting the quality of the processed second image or the quality of the processed third image displayed on the display unit in real time,
   wherein the control unit displays remaining memory and the displayed remaining memory is configured for changing when the quality of the processed second image or the quality of the processed third image is adjusted in real time via the level bar,
   wherein the preview image is reduced by half with respect to the display unit and displayed on an entire half of the display unit, and
   wherein each of the second and third images is reduced to equal size and displayed on the other half of the display unit.

2. The apparatus of claim 1, wherein the control unit is further configured to control image size of the preview image, select a quantizing coefficient, code and compress the second image or the third image by the selected quantizing coefficient, and control the size of the compressed second and third image.

3. The apparatus of claim 2, wherein the control unit is further configured to select one of a plurality of quantizing coefficients according to a user's selection and compress the acquired image according to the selected quantizing coefficient to vary the quality of the processed second image or processed third image.

4. The apparatus of claim 2, wherein the control unit is further configured to store the acquired image in a temporary storage unit, code and compress the acquired image by one or more quantizing coefficients, and store one compressed image in the temporary storage unit according to one compression ratio selected by a user.

5. The apparatus of claim 1, wherein the first image processing unit includes a preview image processing unit for processing the acquired image and reducing the processed image to provide the preview image.

6. The apparatus of claim 5, wherein the preview image processing unit includes a first image reducing unit for reducing the size of the processed acquired image.

7. The apparatus of claim 6, wherein the first image processing unit includes a second image processing unit for varying image quality of the acquired image and reducing the acquired image having varied image quality to provide the second image and the third image.

8. The apparatus of claim 7, wherein the second image processing unit includes an image quality varying unit for coding and compressing the acquired image by a certain quantizing coefficient, decoding the compressed image and providing the second image and the third image.

9. The apparatus of claim 7, wherein the second image processing unit codes and compresses the acquired image according to a plurality of quantizing coefficients in order to generate a plurality of compressed images, separately decodes the plurality of compressed images and provides the second image and the third image.

10. The apparatus of claim 7, wherein the second image processing unit includes a second image reducing unit for reducing the size of the acquired image.

11. The apparatus of claim 1, further comprising:
    an image dividing unit configured to provide the preview image, the second image and the third image for display on the display unit as a multiview image.

12. The apparatus of claim 1, further comprising:
    a storage unit configured to store a table of quantizing coefficients corresponding to a plurality of compression ratios.

13. The apparatus of claim 1, further comprising:
    a temporary storage unit configured to temporarily store the second image and the third image.

14. The apparatus of claim 1, wherein the control unit is further configured to select a mode for displaying a quality variable image.

15. An image photographing method comprising:
    acquiring an image of a subject via a camera;
    creating a preview image of the acquired image via an image processing unit;
    creating a second image having an image quality different from an image quality of the preview image by quantizing the acquired image via a control unit;
    displaying the preview image, the second image and a third image on a display unit as a multiview image, each of the entire preview image, the entire second image and the entire third image being displayed at a reduced size;
    displaying a level bar on the display unit, and
    storing the acquired image via the control unit according to a selected image quality,
    wherein the level bar is configured for individually adjusting, in real time, the quality of the second image or the third image displayed in the multiview image on the display unit, wherein the control unit is further configured to display remaining memory and the displayed remaining memory is configured for changing when the quality of the processed second image or the quality of the processed third image is adjusted in real time via the level bar wherein the preview image is reduced by half with respect to the display unit and displayed on an entire half of the display unit, and wherein each of the second and third images is reduced to equal size and displayed on the other half of the display unit.

16. The method of claim 15, wherein creating the preview image comprises processing the acquired image.

17. The method of claim 15, wherein creating the preview image comprises reducing a size of the acquired image.

18. The method of claim 15, wherein creating the second image and the third image comprises:

selecting a quantizing coefficient to vary quality of the acquired image;

coding and compressing the acquired image by the selected quantizing coefficient; and decoding the compressed image and creating the second image and the third image.

19. The method of claim 18, wherein compressing the acquired image further comprises temporarily storing the compressed image.

20. The method of claim 15, wherein creating the second image and the third image comprises:

selecting a plurality of quantizing coefficients to vary image quality of the acquired image;

coding and compressing the acquired image according to each of the selected plurality of quantizing coefficients to generate a plurality of compressed images;

decoding the plurality of compressed images and creating the second image and the third image, the second image and the third image having different image quality from each other; and reducing a size of each of the second and third images.

21. The method of claim 15, wherein displaying the multiview image comprises combining the preview image, the second image and the third image into a single image and displaying the single image.

22. The method of claim 15, further comprising selecting a mode for displaying a quality variable image.

23. An image photographing method comprising:

acquiring an image of a subject via a camera;

creating a preview image of the acquired image via an image processing unit;

creating a second image and a third image by quantizing the acquired image via a control unit, the second image and the third image having different image quality from each other;

displaying the preview image in its entirety and the second and third images in their entirety on a display unit as a multi-view image, each of the preview image and the second and third images being displayed at a reduced size;

displaying a level bar on the display unit, and storing the acquired image via the control unit according to a selected image quality, wherein the preview image is reduced by half with respect to the display unit and displayed on an entire half of the display unit, and wherein each of the second and third images is reduced to equal size and displayed on the other half of the display unit.

* * * * *